Figure 5:
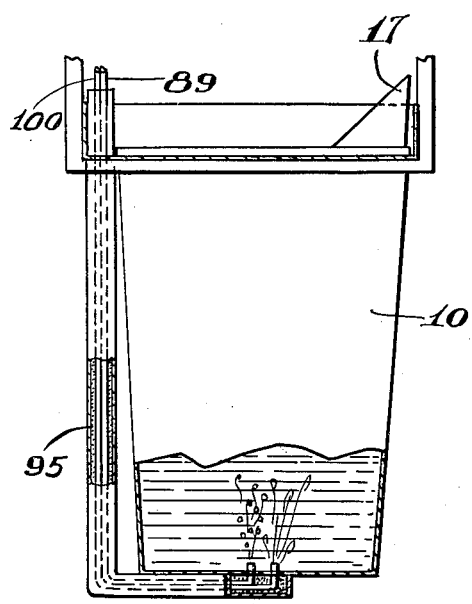

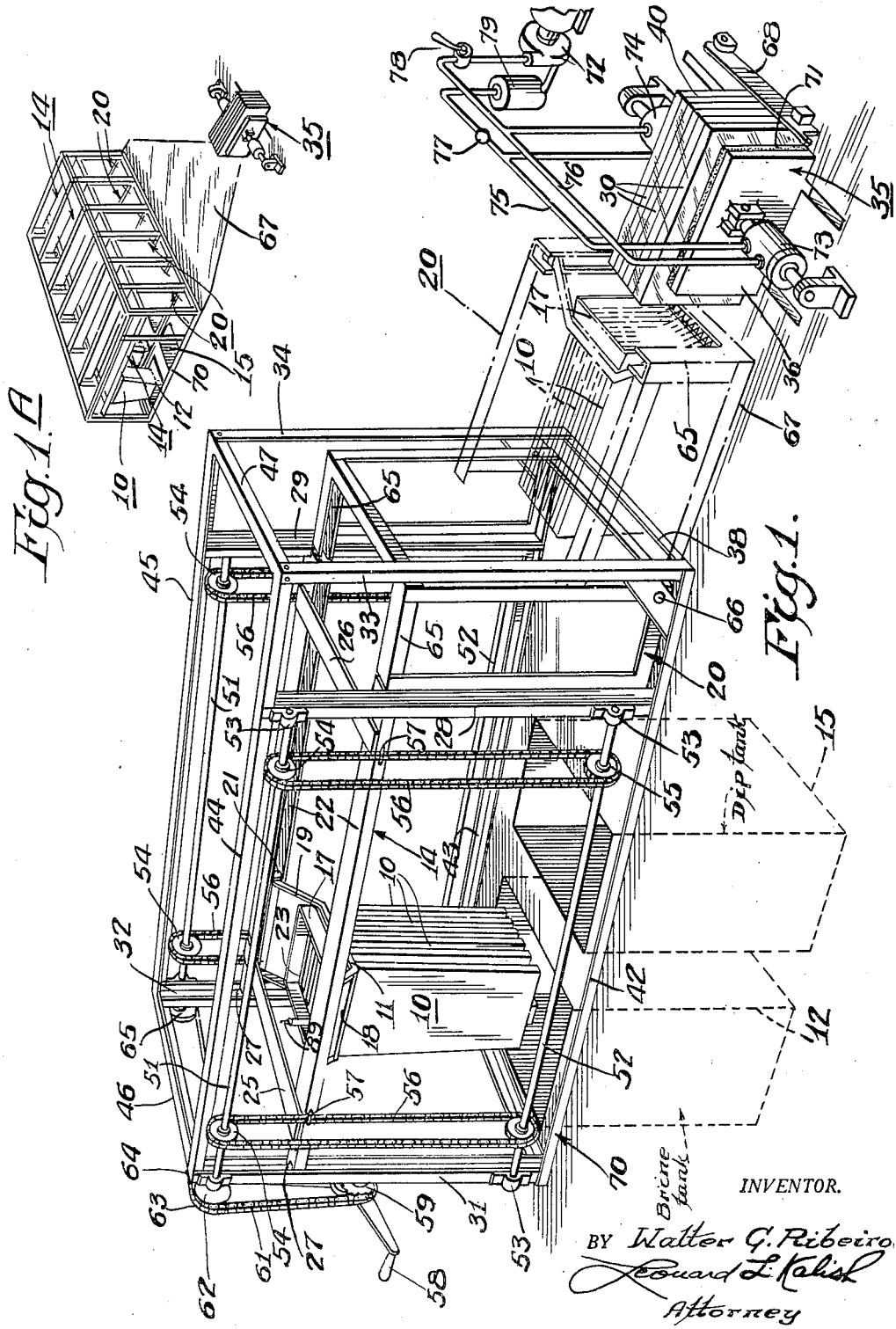

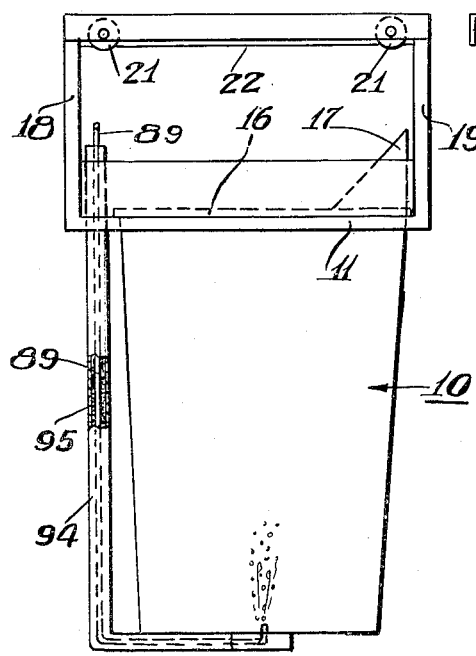
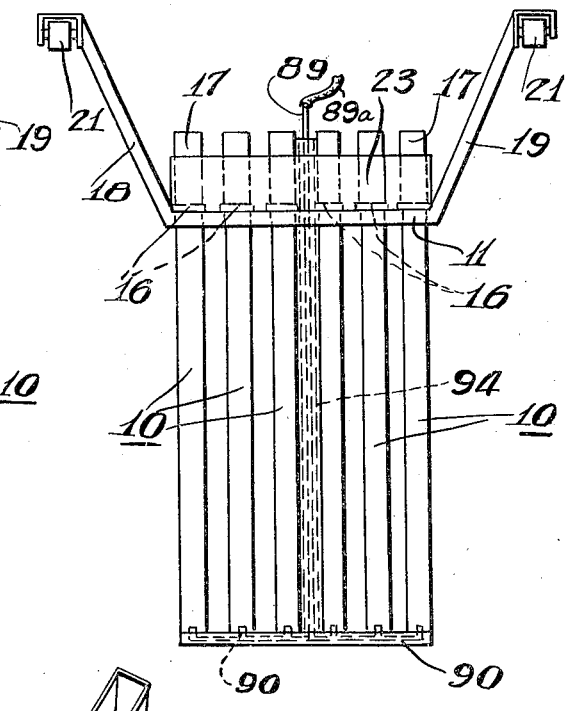
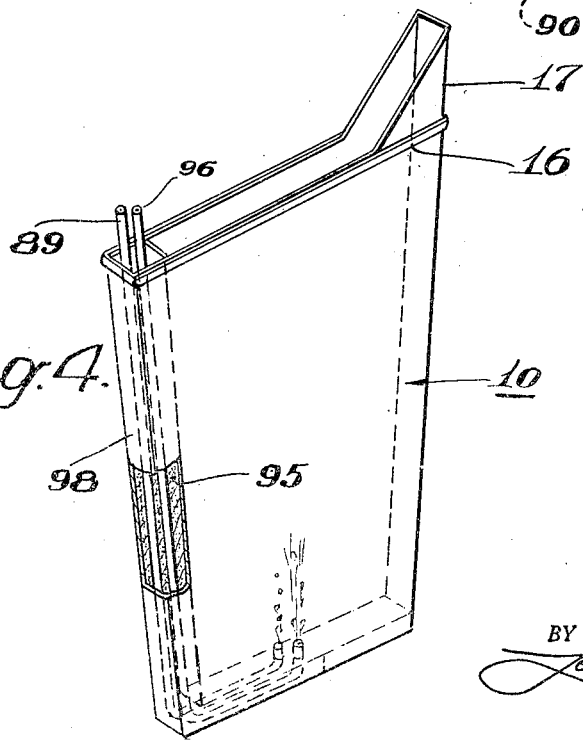

May 9, 1950 W. G. RIBEIRO 2,506,614
METHOD OF MAKING ICE AND APPARATUS THEREFOR
Filed April 17, 1944 4 Sheets-Sheet 3

INVENTOR.
Walter G. Ribeiro
BY
Leonard L. Kalish
Attorney

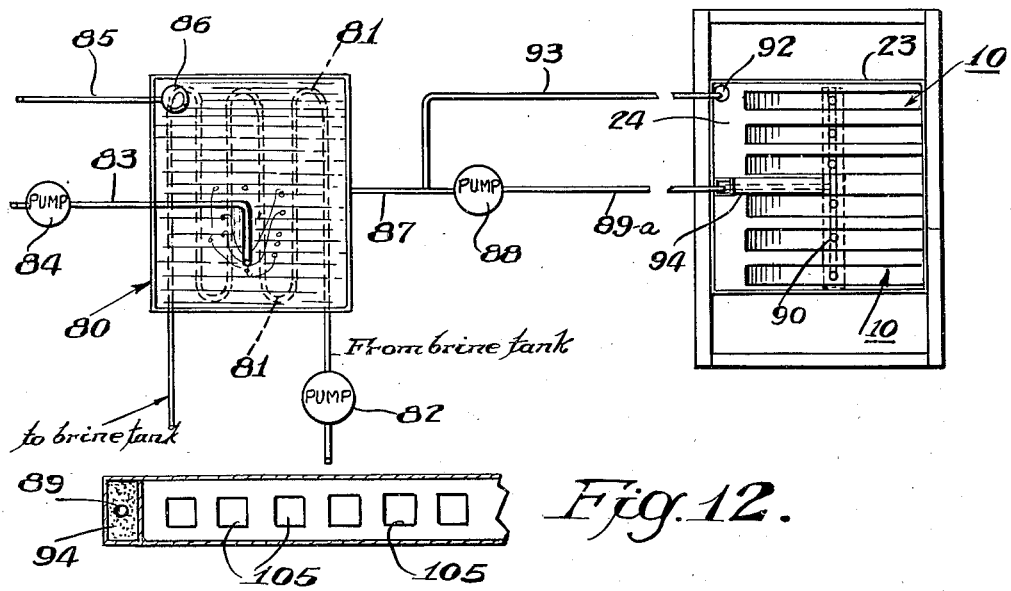
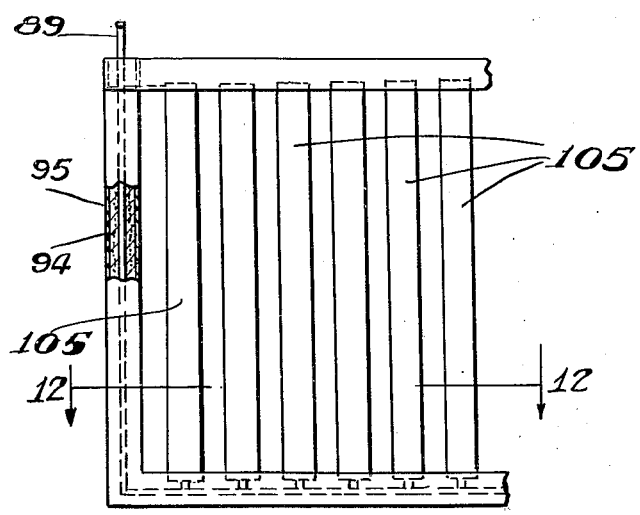

Patented May 9, 1950

2,506,614

UNITED STATES PATENT OFFICE 2,506,614

METHOD OF MAKING ICE AND APPARATUS THEREFOR

Walter G. Ribeiro, Camden, N. J.

Application April 17, 1944, Serial No. 531,402

4 Claims. (Cl. 62—105)

The present invention relates to a method and apparatus for making ice blocks. The invention further relates to ice blocks of predetermined size and contour provided with cleavage planes formed by uniting a plurality of thin ice slabs of unit contour and size.

In the usual can system for making ice, a can containing 300 or 400 lbs. water is immersed in brine at a sufficiently low temperature to freeze in about 40 to 50 hours. Freezing occurs at once if distilled water is used, but if raw hard water saturated or entrained with air is used, it is generally necessary to agitate the water to avoid production of ice that is not clear, discolored, and of poor strength. For this purpose, low (3 lbs. per sq. in. or less) or high (15 to 20 lbs. per sq. in.) pressure air is introduced into the cans to agitate the water. The agitation by air serves to prevent formation of opaque ice caused by the dissolved air as well as to keep any solid particles and salts in the water in suspension which will collect in a central core or turbid unfrozen water. This turbid water is removed by a suction tube and replaced by fresh water to complete the solid block of ice.

After the cans of water are frozen, they are immersed in water at room temperature or above to loosen the cake which is removed from the can by dumping. The cake is then provided with grooves or cuts by means of a scoring machine at the points where the cake is to be split into 25 and 50 lb. or larger pieces for retail sale.

In the present commercial methods of making ice as previously outlined, large metal cans are used having a capacity of 300 or 400 lbs. water and having a cross-section of 11 x 22 inches. Such large mass of water is difficult to freeze as the ice first forms on the inside surface of the can and gradually grows inwardly. Ice is a poor heat conductor and as the ice layer grows it becomes more difficult to freeze the remaining water. Furthermore, it is difficult to uniformly agitate the large mass of water in each can in order to remove dissolved air and impurities in the raw water. Prior methods for making standard size blocks of ice thus entail high cost of power, labor, besides requiring long freezing time which ties up expensive equipment and reduces the output and efficiency of the plant.

According to the present invention, an improved efficient method and apparatus is provided for making ice blocks at lower power consumption and with considerably increased production for a given plant investment. Furthermore, a unique ice block is produced according to the present invention which has many advantages and considerable commercial utility as will be explained hereinafter.

For the purpose of illustrating the invention, there is shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Figure 6:
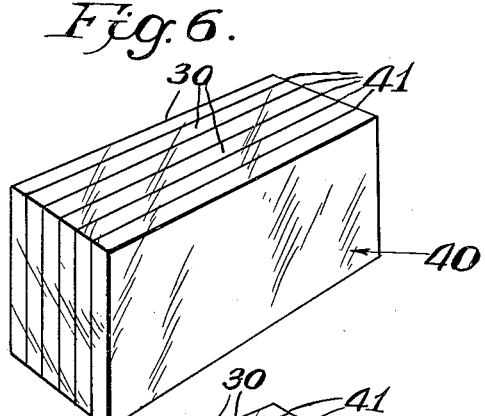
Figure 7:
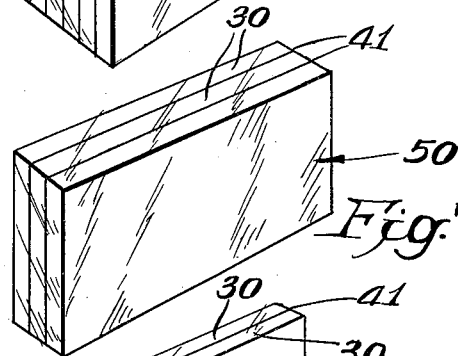
Figure 8:
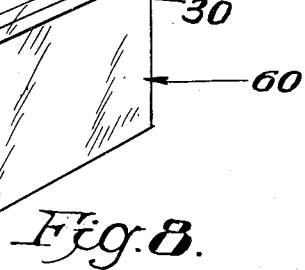
Figure 9:
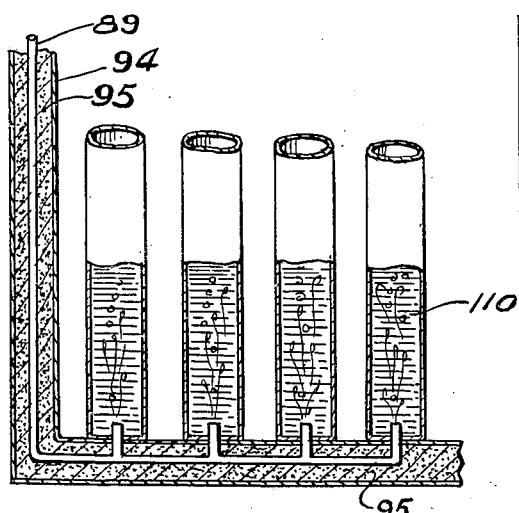

Figure 1 is a perspective view of an apparatus for making composite ice blocks,

Figure 1A is a perspective view of a number of laterally juxtaposed units as illustrated in Figure 1, Figure 2 is a side view of a cradle support for a plurality of ice cans adapted for making relatively thin ice slabs, Figure 3 is a side front view of the cradle support having a number of relatively thin ice cans supported therein, Figure 4 is a perspective view of a relatively thin ice can for making ice slabs, being partly broken in section to show the insulating casing structure, Figure 5 is a side view, partly in section, of an ice can provided with insulated air or water pipes, Figure 6 is a perspective view of a completed composite ice block made in accordance with the present invention, Figure 7 is a perspective view of a composite ice block of one-half the dimensions of the block shown in Figure 6, Figure 8 is a perspective view of a composite ice block of one-third the dimensions of the block shown in Figure 6, Figure 9 is a fragmental side view, partly in section, of a container for making ice cylinders, Figure 10 is a diagrammatic plan view of a water supply system for the ice cans, Figure 11 is a fragmental side view, partly in section, of a container for making rectangular shaped bars of ice, and Figure 12 is a sectional view taken on lines 12—12 of Figure 11.

According to the present invention, instead of using the standard large size metal cans having a capacity of 300 or 400 lbs. and a cross-section of 11 x 22 in. at the top, I utilize a plurality of suitably dimensioned galvanized iron cans 10, as shown in Figure 1, which have, for example, a rectangular cross-section, 2 in. or less x 22 in. and a depth of 44 in. or more. The cans are provided with a smooth interior surface and are preferably tapered downwardly to a slight degree to facilitate removal of the ice blocks formed therein. A plurality of such identical cans, for example five or six, are suspended in a suitable cradle or holder 11. After the narrow cans are filled with raw water they are immersed, while supported in cradle 11, in the brine tank 12, the water in the cans is suitably agitated by a jet of air admitted at the bottom of the cans and frozen to form a plurality of relatively thin ice blocks. The cans 10 while still supported in cradle 11 are then removed from the brine tank and immersed in dip tank 15 containing water at room temperature or higher to loosen the slabs from the individual can walls. The cans are then transferred to a dumping device 20, which when suitably tilted manually or by mechanical means to the dotted position shown in Figure 1, permits the slabs 30 of ice to slide out of the individual cans to the press 35.

The slabs 30 are preferably of the same unit contour and size, and have substantially smooth planar faces. They are rectangular in cross-section and relatively thin, being about 2 in. or less in thickness. They should all be aligned with their slight taper extending in the same direction. They are then compressed by two opposed press platens 36 under sufficient pressure so that the contacting flat faces of the slabs cohere firmly together to form an integral standard size block as shown in Figure 6, having substantially smooth outer surfaces and having an overall contour and size that is a multiple of a single slab.

In making a standard commercial size block of ice measuring 11 in. x 22 in. x 44 in., I may use, for example, five narrow cans to make five thin slabs of ice 2.2 in. x 22 in. x 44 in. The invention, however, is not restricted to the number of narrow cans that may be used. In Figures 1 and 3 of the drawings, for example, six narrow cans are shown that are of such dimensions as to provide six ice slabs of the same unit contour and size, which compressed and cohered together will form a standard size ice block 11 in. x 22 in. x 44 in., as shown in Figure 6 and having five equally spaced parallel cleavage planes 41.

The individual ice slabs are made so as to have substantially smooth, even, planar flat faces and preferably have identical dimensions so as to be of the same unit contour and size. When the slabs are dumped from the narrow cans their outer surfaces are in a wet condition, and when the flat faces of adjacent aligned slabs are brought together in face-to-face contact under pressure, they will fuse or cohere firmly together. When these united slabs are conveyed immediately to the storage house or freezing chamber, the slabs will knit or freeze together to form an integral block of ice 40 as shown in Figure 6, having parallel spaced cleavage planes 41 at the joined planar surfaces of the individual slabs. The integral block of ice is clear, transparent and the cleavage planes are not generally visible to the eye. When sufficient cleavage force is applied along the cleavage planes by a sharp instrument such as an axe or pick, the block 40 may be split into any suitable aliquot fractional parts as desired along any selected cleavage plane. Aliquot fractional parts of a standard ice block can also be readily manufactured in accordance with my invention by assembling a smaller number of slabs than that required for a standard block. For example, by compressing only three slabs, a half-size block 50 can be produced, as shown in Figure 7. A one-third-size block 60 can be made by compressing and uniting two slabs, as shown in Figure 8.

Referring again to Figure 1, there is illustrated a suitable apparatus for carrying out the method previously described. Obviously, the narrow cans can be handled and conveyed during the different stages of the process by either manual or automatic equipment. In Figure 1, there is illustrated mechanical means for making six relatively thin ice slabs into a single integral ice block 40. The individual narrow metal ice cans 10 are supported in a cradle 11 in spaced apart relation, so as to permit brine circulation at all the external faces of the cans. The cans are suspended and retained securely by their collar portion 16, as shown in Figure 4. A spout or guide portion 17 formed by extending the wall portions of the can at one end of the top of each can serve as a guide to direct the sliding of the slabs directly into the press when the cans are dumped. The spout is preferably formed by extending the adjacent wall portion of the can so that the inner spout surfaces and adjacent inner can wall surfaces are continuous.

The cradle 11 is provided with two oppositely positioned upwardly extending bracket members 18 and 19, carrying a pair of spaced rollers 21 that ride in spaced horizontal tracks 22. Cradle 11 can be moved horizontally by any suitable motor driven means or manually to any desired station along tracks 22 so as to align the cans 10 over the brine tank station 12 or over the dip tank station 15, at which stations the cradle with the cans can then be lowered into these tanks in sequence.

Track members 22 are joined by cross-members 25 and 26 spaced slightly inwardly from both ends of the tracks. Rollers 27 are provided at the extreme ends of the tracks 22 which are adapted to ride in upright vertical channel members 31 and 32, at one end of the fixed frame 70, and in the channels of vertical frame members 28 and 29, adjacent the other end of the fixed frame 70. Fixed frame 70 is reinforced by lower cross-members 42 and 43, lower end members 37 and 38, top members 44 and 45, and top cross-members 46 and 47. Tracks 22 together with cross-members 25 and 26 constitute an inner vertically movable frame designated by numeral 14, within the outer fixed frame 70 to permit immersion of the cans either in the brine tank or the dip tank as desired.

In order to lower the movable frame 14, a pair of upper shafts 51 and a pair of lower shafts 52 are provided at opposite sides of the fixed frame 70, supported at their extremities in bearings 53. Upper shafts 51 are provided with sprockets 54 adjacent each end. Lower shafts 52 are provided with a pair of similar sprockets 55 adjacent each end. Chains 56 pass over each pair of upper and lower sprockets 54 and 55. Chains 56 are fixedly attached at 57 to the track members 22. Shafts 51 can be motor actuated or can be manually operated by means of handle 58 which actuates sprocket 59, over which passes chain 61 for actuating sprocket 62, carried on shaft 51. Another sprocket 63 on shaft 51 has a chain 64 passing thereon and over sprocket 65 carried on the rear upper shaft 51, whereby both upper shafts 51 will be rotated simultaneously when handle 58 is revolved. As shafts 51 are rotated they will cause the fixed upper sprockets 54 to rotate and thus cause chains 56 to travel about the lower sprockets 55, thus raising or lowering the inner frame member 14 carrying the track members 22.

When it is desired to lower the ice cans 10 into the brine tank 12, the crade 11 in its elevated position is first moved by rolling it on tracks 22 so as to be aligned directly over the brine tank. Upon turning handle 58, frame member 14 is lowered until the ice cans are immersed in the brine tank to a level just below their upper open ends. After the water in the tanks 10 is frozen to form finished ice slabs, the frame member 14 is raised sufficiently by rotating handle 58 so that cradle 11 is again in elevated position for horizontal travel. The cradle is then moved horizontally and positioned so as to align the cans over the dip tank 15. The handle 58 is then again turned to immerse the cans in the dip tank 15 to sufficiently melt the ice so as to permit the slabs to be removed from the individual ice cans 10. The frame member 14 is then elevated to remove the ice cans out of the dip tank and into elevated position to permit horizontal travel of the cradle 11 to the dumping station. The cradle 11 is then manually moved into the dumper 20, which is provided with tracks 65, forming aligned continuations of tracks 22, so that rollers 21 of cradle 11 can readily ride into the tracks provided in dumper 20. The dumper 20 is adapted to be tilted on pivots 66 by any suitable manual or automatic means to assume the dotted position shown in Figure 1, so as to permit the individual ice slabs 30 to slide out freely on platform 67 and into the press 35.

The ice slabs 30, having their taper aligned in the same direction, are then aligned by contacting a pivoted guide bar 68. The opposed platens 36 of the press are then actuated to apply suitable pressure to the assembled ice slabs so as to cause them to cohere at their contacting flat faces.

The press 35 may be of any suitable construction. The platens 36 may have their inner faces provided with a yieldable lining 71 of rubber, felt and the like, so that the pressure applied to the slabs by the platens will be slightly yielding to avoid fracturing or chipping of the slab surfaces that are contacted by the platens. The lining 71 also serves to prevent adhesion of the ice block thereto and ensures separation of the ice block therefrom when the press platens are moved apart.

I find it advantageous to have the platens 36 of the press smaller in length than the ice slabs 30, to permit tying the two ends of the block with strong straps provided with snap buckles and rings in order to facilitate the handling of the ice blocks. The platens may be actuated by any suitable means such as by hydraulic pressure supplied by pump 72 to cylinders 73 and 74 through pipes 75 and 76. Pressure applied by the platens is controlled by valve 78. A safety valve 77 and sump 79 are provided in the hydraulic pipe line 75.

After the ice slabs are dumped from the ice cans, the cradle is brought back to its vertical position. It is then brought back to the station over the dip tank, and the ice cans are then filled with water. The cradle and the cans supported thereby are then brought back on the tracks 22 over the brine tank station, and the operation is repeated for forming additional ice slabs in the manner previously described.

Although a single cradle unit is illustrated in Figure 1, it is obvious that a plurality of such units can be positioned in juxtaposed relation so that a plurality of ice blocks can be manufactured simultaneously, or in a timed sequence, in order to utilize the equipment with maximum efficiency. For example, in Figure 1A, there is illustrated six juxtaposed units, as previously described, which feed the ice slabs to a single press 35.

In order to produce ice of the greatest clarity, the water used should be of the purest quality. This can be normally attained by proper filtration and sometimes double filtration is required. If the water after double filtration is still not fit for making clear ice it should be first filtered in the usual manner. The water is then conveyed to a porcelain lined container where it is agitated by means of two or more agitating devices of the same shape and construction as the egg beaters used in homes. This will agitate and circulate the water violently and will serve to remove any air entrained in the water and to precipitate impurities. The water is then filtered again and pumped to the filling tank.

A further feature of my invention resides in precooling and preagitating the water prior to use in the ice cans in order to purify the water so as to form very clear ice therefrom. For this purpose, as shown in Figure 10, I provide a precooling tank 80 having cooling coils 81 through which cooling brine from the brine tank is circulated by a pump 82. The water in the tank is cooled to about 34° F. and is maintained at a temperature above freezing by means of a thermostat control which will shut off the brine circulation when necessary. An air tube 83 is connected to the bottom of the tank 80, air pressure being supplied by a low pressure blower or compressor 84. Water is supplied to the tank by pipe 85 controlled by a float valve 86 to a desired level. The water from the tank 80 is conveyed through pipe 87 by pump 88 to a flexible hose 89a leading to the upper end of the supply pipe 89 the lower end of which is connected to a manifold 90 which is suitably connected to the bottom of the individual ice cans 10, as shown more clearly in Figure 3. The portion of pipe 89 and manifold 90 which are immersed in the brine tank are insulated to prevent freezing of the supply water therein during freezing of the ice blocks. The portion of pipe 89 and the manifold 90 immersed in the brine are surrounded and insulated with a good insulating material 95 such as kapok, granulated cork, mineral wool, etc., or by a vacuum surrounding the pipe 89. The insulated portion of pipe 89 and manifold 90 are provided with an outer protective metal casing 94. The size of the outside casing and the quantity and character of the insulation used will depend on the length of time the pipe 89 is immersed in the brine for freezing the ice. Overflow of water from the individual ice cans is collected by a suitable top overflow basin 23 provided on cradle 11 to collect and drain the overflow to funnel 92 and into overflow tank 24. The water is then recirculated through a flexible hose 93 either to the pump, as shown in Figure 10, or to the tank 80 if desired. The pump 88 serves to maintain a constant circulation of water in a closed system from the tank 80 through the individual cans 10 during freezing of the blocks. The water in the precooling tank 80 is agitated by air introduced at the bottom or side through tube 83.

The agitation and circulation of the water in the closed system results in producing ice blocks of very clear ice that are practically coreless. This procedure can be applied effectively to my narrow ice cans as well as to standard size ice cans with equally good results. If desired, I may circulate the water in the ice cans 10 as previously described and also agitate the water in the ice cans by air pressure supplied by an air tube connected to the bottom in the manner illustrated in Figure 5.

I may omit circulation of the water in the cans 10 in the system illustrated in Figure 10, and only agitate the water in the cans by air pressure supplied through pipe 89 and manifold 91, as illustrated for example, in Figures 2 and 3; the pipe 89 being connected to any suitable source of compressed air by a flexible hose (not shown). In such case the ice cans are completely filled with water and permitted to overflow into the overflow basin or receptacle. This procedure will allow the impurities in the water to concentrate in the overflow basin and decrease the size of the turbid core in the ice block.

A further feature of my invention resides in providing each of the individual ice cans 10 with a separate water supply tube 96 and an air supply tube 89, as shown in Figure 4, these tubes being surrounded with kapok, mineral wool, granulated cork, etc. 95, protected and retained by an outer metal casing 98, and being connected, at their upper ends, to flexible hoses (not shown) leading to sources of water and compressed air, respectively. The insulation serves to prevent freezing of any moisture carried into the air supply tube, thereby avoiding clogging of the air stream. Similarly, the water supply stream will not freeze in water supply tube 89. The outer casing 95 is made integral with the can as shown in Figure 4 or it may be spaced away slightly from the can walls so that non-freezing zones are not present in the can.

Insulation of the air supply tubes is very advantageous as it permits the use of low pressure air for agitating the water in the cans. Low pressure air carries considerable moisture which would clog the air supply tubes upon freezing when immersed in the brine tank. Accordingly, it has been found necessary prior to my invention to dehydrate or dry the air used for agitating purposes. The use of a dehydrator and other equipment for drying the air is thus obviated by means of my insulated supply tubes.

From the foregoing explanation, it will be apparent that elimination of discoloration and opacifying constituents in water for clarification of the ice may be achieved by any one of four methods of agitating the water in the ice cans, namely, (1) by air agitation alone, (2) by water circulation alone, (3) by a combination of air agitation and water circulation, and (4) by water circulation and air preagitation in the precooling tank.

Instead of making rectangular ice slabs as previously described, I may make bars of ice rectangular or square in cross-section of small dimensions by utilizing long cans 105 having the desired cross-section as illustrated in Figures 11 and 12. I may also use cylindrical cans 110 as illustrated in Figure 9. The air or water supply tubes 89 are surrounded by a suitable insulating material 95 and enclosed in an outer casing 94 for the purpose of preventing freezing of water in the supply pipe 89, as explained previously. These cans can be supported in the cradles 11, previously described, for efficient handling during the various stages of making the ice. The cylindrical or rectangular ice bars may be cut into chips, flakes or cubes as desired by any suitable equipment. By properly agitating and/or circulating the water in the cans 105 and 110 very clear ice will be produced.

I have found that ice can be frozen in a tube 1¾" in diameter at 16° brine in less than 30 minutes. It is thus evident that by supporting in a cradle a plurality of either cylindrical or rectangular tubes of suitable cross-section dimensions and freezing the water contained therein to form ice blocks in the manner previously described, I can obtain a large quantity of ice suitable for cutting into cubes in very little time, at low cost and with a minimum of waste. My method is thus much more efficient as compared with the present methods of cutting ice cubes from standard size ice blocks that require at least 40 hours to freeze, besides entailing a wastage of 25 to 30% when cutting the blocks into small ice cubes.

My process for making clear ice in tall narrow ice cans is also advantageous for making crushed ice rapidly and economically. For this purpose, a group of say 25 narrow ice cans can be supported in my equipment by a single cradle equipped with a suitable overflow. The precooled and preagitated water in these ice cans is recirculated in the manner previously described as illustrated in Figure 10. By using 25 narrow ice cans it is possible to produce the equivalent of five 300 lb. cans of ice every two hours, depending on the temperature of the brine, or the equivalent of sixty 300 lb. cans every 24 hours. The ice is dumped from the cans in a suitable receptacle, mounted on a conveyor, and carried to the ice-crushing machine.

According to the present invention ice blocks can be manufactured at considerably lower cost and with much smaller plant equipment as compared with the methods now used. For example, an ice plant having 400 standard size ice cans can make 200 standard size blocks every 24 hours. By utilizing my method and equipment 200 standard size blocks can be made using only 16 units of my equipment. It takes from 40 to 50 hours to freeze a standard 300 lb. block of ice as compared with the freezing time of about two hours for an ice can 2 x 22 in. cross-section x 44 in. deep at 16° brine. Thus it is seen much less equipment is needed when practicing my invention as compared with present methods for making the same number of standard size ice blocks.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

What I claim as new and desire to protect by Letters Patent is:

1. Apparatus for making ice blocks formed of a plurality of cohered relatively thin slabs of ice comprising a fixed frame member, a pair of spaced track members movable vertically in said frame member, a cradle supported on said track members, rollers on said cradle for supporting and translating said cradle horizontally on said track members to a series of stations, means for supporting a plurality of spaced ice cans on said cradle, means for vertically raising and lowering said track members and the cradle supported thereon for lowering the said ice cans into a brine tank and dip tank positioned at successive stations, and a dumper for receiving and supporting said cradle.

2. A method of forming ice blocks which comprises quick freezing water in relatively thin rectangular slabs having substantial longitudinal and transverse dimensions and having a thickness of not more than about one-tenth of either of the other dimensions, said slabs having relatively smooth and wet sides, disposing more than two of said slabs in generally parallel side-by-side relationship, and simultaneously uniting all of said slabs under pressure to form a more or less integral block of ice having generally the same transverse and longitudinal dimensions as the original slabs and having a thickness approximating the total thicknesses of the individual slabs and having lines of cohesion extending only along generally parallel transverse planes.

3. A method of forming ice blocks which comprises quick agitating and freezing water in relatively thin layers thereby to form a plurality of rectangular slabs of ice having substantial longitudinal and transverse dimensions and having a thickness of not more than about one-tenth of either of the other dimensions, disposing more than two of said slabs in generally parallel side-by-side relationship, said slabs having relatively smooth and wet sides, and thereafter simultaneously uniting all of said side-by-side slabs under pressure, thereby to form a more or less integral block of ice having generally the same longitudinal and transverse dimensions as the original slabs and having a thickness approximately the same as the total thicknesses of said individual slabs and having lines of cohesion extending only along generally parallel transverse planes.

4. Apparatus for quick-freezing relatively thin ice-blocks, said apparatus comprising a fixed frame-member constructed and arranged to be mounted above an open freezing-tank and a dip-tank disposed in adjacent relationship to each other, a cradle-support extending horizontally across said frame-member and constructed and arranged to be raised and lowered therewithin, spaced track-members carried by the cradle-support, a cradle carried by said cradle-support, said cradle being provided with rollers mounted on said spaced track-members whereby said cradle is horizontally movable along said cradle-support, a plurality of relatively thin ice cans carried by said cradle in downwardly-extending generally parallel relatively closely adjacent relationship, said cradle-support and cradle being constructed and arranged to be lowered to immerse the water-filled ice cans into the freezing-tank, and thereafter raised to remove the ice cans from the freezing-tank, said cradle being constructed and arranged thereafter to be moved horizontally along the cradle-support to permit dipping of the ice cans into the dip-tank preliminary to dumping of the ice from the ice cans, and dumping mechanism having fixed spaced track-members with which the track-members of the cradle-support can be aligned to permit the cradle to be rolled from the cradle-support directly onto the dumping mechanism after the dipping operation, said dumping mechanism being constructed and arranged to tilt the ice cans thereby to permit the ice-slabs to slide out by gravity.

WALTER G. RIBEIRO.

REFERENCES CITED

The following references are of record in the file of this patent:

UNITED STATES PATENTS

| Number | Name | Date |
| --- | --- | --- |
| 258,226 | Gorgens | May 23, 1882 |
| 301,539 | Vezin | July 8, 1884 |
| 703,314 | Smith | June 24, 1902 |
| 706,510 | Barrath | Aug. 12, 1902 |
| 1,020,759 | Holden | Mar. 19, 1912 |
| 1,327,414 | Willcox | Jan. 6, 1920 |
| 1,505,890 | Hexamer | Aug. 19, 1924 |
| 1,616,492 | Lado | Feb. 8, 1927 |
| 1,732,802 | Bloom et al. | Oct. 22, 1929 |
| 1,755,203 | Bright | Apr. 22, 1930 |
| 1,838,772 | Lawrence | Dec. 29, 1931 |
| 1,996,274 | Burks | Apr. 2, 1935 |
| 2,242,155 | Uline | May 13, 1941 |
| 2,245,673 | Huenerfauth | June 17, 1941 |

FOREIGN PATENTS

| Number | Country | Date |
| --- | --- | --- |
| 4,809 | Sweden | Aug. 30, 1893 |